Patented Oct. 22, 1935

2,018,031

UNITED STATES PATENT OFFICE 2,018,031

CONCENTRATION OF ALIPHATIC ACIDS

Horace Finningley Oxley and Walter Henry Groombridge, Spondon, near Derby, England, assignors to Celanese Corporation of America, a corporation of Delaware No Drawing. Application February 17, 1933, Serial No. 657,260. In Great Britain March 7, 1932

6 Claims. (Cl. 260—122)

This invention relates to the concentration of dilute acetic or other fatty or aliphatic acids and has particular reference to the manufacture of concentrated acetic acid from industrial dilute acetic acids such as crude pyroligneous acid, acetic acid obtained as a waste product in acetylation processes such as the acetylation of cellulose, fermentation acid, etc.

It has long been known to concentrate dilute aliphatic acids by subjecting them to extraction with solvents for the acids. In such a method of concentration, however, it is necessary either to subject the acid to repeated extractions or to use very large quantities of solvents if highly concentrated acids are to be obtained, or it is very difficult to obtain acids of higher concentration than about 70% owing to the solubility of water in the solvents.

The present invention provides a method whereby these disadvantages may be largely or entirely overcome or eliminated.

According to the invention the dilute acetic or other aliphatic acid is extracted with a volatile solvent to produce a relatively concentrated acid, for instance an acid of about 60 to 70% concentration; the volatile solvent is then wholly or partly separated and the relatively concentrated acid is further concentrated by removal of water in the form of an azeotropic mixture and especially as an azeotropic mixture of higher boiling point than the volatile solvent.

In practice the removal of water in an azeotropic mixture of boiling point higher than that of the volatile solvent presents important advantages, since, as further set out below, the azeotropic mixture may be passed in heat exchange with the extract to assist in the removal of the volatile solvent therefrom by distillation.

For the purposes of the invention any low boiling solvent capable of extracting the aliphatic acid from its aqueous solutions may be employed. Ether, ethyl acetate and chloroform may be mentioned as examples of solvents that are very useful for the purposes of the invention, ether being especially useful. The extraction with the volatile solvent or solvents may be performed in any convenient way, as for instance by simple batch extraction, or, preferably, in a continuous manner, the dilute acid being passed in an extraction column or other suitable apparatus counter-current to the ether or other volatile solvent or solvents employed. As above mentioned, after the extraction the volatile solvent or solvents are wholly or partly removed from the relatively concentrated acid; preferably such removal is effected to a very substantial degree and advantageously the solvent or solvents are removed as far as possible. While the removal of the volatile solvent or solvents may of course be effected by any convenient heat treatment, it may advantageously be effected by utilizing the heat of condensation of the azeotropic mixture resulting from the azeotropic removal of the water from the relatively concentrated acid.

After the removal or partial removal of the volatile solvent or solvents the water may be removed from the relatively concentrated acid in the form of an azeotropic mixture by means of any convenient entraining liquid. Such removal may be effected in any convenient way and to any desired degree. Conveniently such removal may be effected by subjecting the relatively concentrated acid to distillation in a column, still or the like, the entraining liquid being added to the reatively dilute acid (either prior to distillation or concurrently or continuously therewith) and/or introduced into the column, preferably at or near the top thereof, in liquid form. If desired, however, the entraining substance may be introduced in vapour form. The azeotropic mixture may be condensed in any convenient way and the entraining liquid may be separated from the water and employed for treatment of further quantities of relatively concentrated acid. Advantageously the condensation of the azeotropic mixture may be effected by heat exchange with the extract as by these means the heat of condensation of the azeotropic mixture can be used to aid or effect the removal of the volatile solvent or solvents. After condensation of the azeotropic mixture and separation of the water, the entraining liquid may be returned, continuously or otherwise, to the column, still or the like for removal of water from further quantities of relatively concentrated acid.

As examples of suitable entraining substances may be mentioned benzene, ethylene dichloride, dichlorethylene, trichlorethylene, ethyl acetate, butyl acetate, or mixtures thereof especially when the solvent employed for the extraction is of lower boiling point than that of the azeotropic mixture of entraining liquid and water. For instance, highly satisfactory results can be obtained by extracting the acid with a low boiling solvent such as ether and removing the water from the relatively concentrated acid by one or more of the above instanced entraining liquids and particularly benzene.

The following is a convenient way of putting the invention into practice. Acetic acid of about 30% strength, for instance a dilute acetic acid such as results from the industrial acetylation of cellulose, is continuously extracted with ether, preferably by passing it counter-current to the ether through one or more extraction columns or the like. The resulting mixture of ether and relatively concentrated acid is passed continuously to a still apparatus wherein the ether is removed as wholly as possible and returned to the extraction apparatus. The relatively concentrated acid, now substantially free from ether, is passed continuously to a second still apparatus, into the column of which at or near the top thereof liquid benzene is introduced. The vaporous azeotropic mixture of benzene and water leaving the still is caused to pass from the second still column to a continuous separator via hollow plates or the like in the first still and/or via a heat exchanger through which the mixture of acid and ether passes to the first still in order to provide by its condensation some or all of the heat necessary to remove the ether in the first still. The benzene is returned from the continuous separator in liquid form to the column of the second still apparatus, while the water may be run to waste.

While the ether may be removed in any convenient way in the first still, it is preferably introduced into the column thereof at a substantial height from the bottom of said column, the plates themselves being advantageously heated, preferably by passing the azeotropic mixture of benzene or water through the plates when hollow plates are employed and/or by passing the said azeotropic mixture through coils or the like disposed upon the plates. The acid freed from ether may be withdrawn from the first still apparatus at any convenient point below the point of introduction of the acid and ether mixture, and passed to the second still apparatus. If desired, the mixture of acid and ether in its passage to the first still may be caused to traverse a heat exchanger through which the condensing azeotropic mixture of water and benzene leaving the second still apparatus or leaving the hollow plates, coils or the like of the first column is caused to pass.

What we claim and desire to secure by Letters Patent is:—

1. Method of concentrating a dilute aliphatic acid, which comprises extracting the dilute acid with an organic liquid which is a solvent for the acid, at least partially separating the said organic liquid from the extract, removing water from the acid solution so obtained in the form of an azeotropic mixture with the vapor of a further organic liquid such that the boiling point of the azeotropic mixture is higher than that of the extracting agent, and passing the hot azeotropic vapor mixture in heat exchange with the extract.

2. Method of concentrating a dilute lower fatty acid, which comprises extracting the dilute acid with an organic liquid which is a solvent for the acid, at least partially separating the said organic liquid from the extract, removing water from the acid solution so obtained in the form of an azeotropic mixture with the vapor of a further organic liquid such that the boiling point of the azeotropic mixture is higher than that of the extracting agent, and passing the hot azeotropic vapor mixture in heat exchange with the extract.

3. Method of concentrating dilute acetic acid, which comprises extracting the dilute acid with an organic liquid which is a solvent for the acetic acid until an acid of concentration between 60 and 70% is obtained, at least partially separating the said organic liquid from the extract, removing water from the acid solution so obtained in the form of an azeotropic mixture with the vapor of a further organic liquid such that the boiling point of the azeotropic mixture is higher than that of the extracting agent, and passing the hot azeotropic vapor mixture in heat exchange with the extract.

4. Method of concentrating dilute acetic acid, which comprises extracting the dilute acid with ether until an acid of concentration between 60 and 70% is obtained, at least partially separating the ether from the extract, removing water from the acid solution so obtained in the form of an azeotropic mixture with the vapor of a further organic liquid such that the boiling point of the azeotropic mixture is higher than that of ether, and passing the hot azeotropic vapor mixture in heat exchange with the extract.

5. Method of concentrating dilute acetic acid, which comprises extracting the dilute acid with ether until an acid of concentration between 60 and 70% is obtained, separating the ether from the extract, removing water from the acid so obtained as an azeotropic mixture with benzene, and passing the hot benzene-water vapor mixture in heat exchange with the extract.

6. Method of concentrating dilute acetic acid which comprises extracting the dilute acid with ether until an acid of concentration between 60 and 70% is obtained, separating the ether from the extract, removing water from the acid so obtained as an azeotropic mixture with benzene, passing the hot benzene-water mixture in heat exchange with the partially concentrated acetic acid-ether mixture, separating the water from the benzene, and returning the benzene to the process.

HORACE FINNINGLEY OXLEY.
WALTER HENRY GROOMBRIDGE.